United States Patent

[11] 3,605,008

| [72] | Inventors | William E. Shoemaker<br>Fullerton;<br>Barret B. Weekes, Newport Beach, both of,<br>Calif. |
|---|---|---|
| [21] | Appl. No. | 825,454 |
| [22] | Filed | Sept. 18, 1968<br>Division of Ser. No. 522,868, Jan. 25, 1966,<br>Pat. No. 3,457,493 |
| [45] | Patented | Sept. 14, 1971 |
| [73] | Assignee | Beckman Instruments, Inc. |

[54] TRANSDUCER NETWORK WITH CURRENT SOURCE CONDITIONING
5 Claims, 4 Drawing Figs.

| [52] | U.S. Cl. | 323/75 N,<br>324/65 B |
|---|---|---|
| [51] | Int. Cl. | G01r 17/10 |
| [50] | Field of Search | 323/1, 4, 75<br>N; 324/65 B |

[56] References Cited
UNITED STATES PATENTS

| 3,488,757 | 1/1970 | Chaparro | 323/75 N |
| 2,843,756 | 7/1958 | Wise et al. | 324/65 X B |
| 2,891,218 | 6/1959 | Werts | 323/75 X N |
| 3,209,248 | 9/1965 | Siefert | 324/65 X B |
| 3,319,155 | 5/1967 | Kooiman et al. | 323/75 N |

*Primary Examiner*—J. D. Miller
*Assistant Examiner*—A. D. Pellinen
*Attorneys*—Robert J. Steinmeyer and Richard M. Jennings ABSTRACT: A transducer network having a multiplicity of branches and related circuit nodes is connected to a constant current supply providing a multiplicity of constant current sources. Branches and nodes of the network which are remotely located from the current sources are connected to the current sources by conductors exhibiting an inherent impedance. A pair of input terminals of a high input impedance amplifier is connected to a pair of nodes of the transducer network.

PATENTED SEP 14 1971     3,605,008

*INVENTORS*
WILLIAM E. SHOEMAKER
BARRET B. WEEKES

TRANSDUCER NETWORK WITH CURRENT SOURCE CONDITIONING

This a division of U.S. Application Ser. No. 522, 868, filed Jan. 25, 1966, by William E. Shoemaker et al., assigned to the present assignee and now U.S. Pat. No. 3,457,493.

This invention relates to multicurrent transducer signal conditioning employing two or three constant current sources and, more particularly, to preferred embodiments thereof employing remotely located transducers.

In the prior art, transducer conditioning of variable resistance transducers such as strain gauges, potentiometers and thermistors, is usually performed with bridge completion resistors, bridge balance potentiometers, shunt calibration resistors and either single-voltage or single-current excitation. Both the single-voltage and single-current transducer conditioners involve significant bridge offset and sensitivity errors, attributable to such things as cable conductor resistance between a transducer conditioner and a remote transducer and its variation with temperature, especially when the transducer cables are thousands of feet long or subject to severe ambient temperature variations.

For one or two remote arms of a bridge the offset and sensitivity errors are the worst offenders. For four remote arms with constant voltage excitation the offset error is not significant, but a significant bridge sensitivity error is often caused by the cable resistance unless remote voltage sensing leads are used, while with single constant current excitation the bridge offset and sensitivity errors caused by the cable resistance are not significant. It is for this reason that a single-constant current transducer conditioner is often used when all four arms of the bridge can be placed in the same location. In many instances, however, only one or two active elements can be placed at the remote test location, and the three or two bridge completion resistors must be located hundreds or thousands of feet away. In this event, the cable conductors become a part of the bridge and neither constant voltage conditioning with remote sensing nor single-constant current conditioning can suppress temperature dependent offset and sensitivity errors.

It is the main purpose of the invention to provide new and improved multicurrent transducer signal conditioning in which transducer conditioning errors due to cable conductor impedance and impedance changes are essentially eliminated, and which will in some embodiments double the sensitivity for a given transducer current. Other purposes of the invention are to accommodate large transducer resistance changes without introducing nonlinearities and to enhance the accuracy and ease of calibration, as well as reduce the amount of cable required.

These and other objects are achieved by providing multicurrent signal conditioning for a transducer network having at last two branches and related nodes, including a constant current supply for providing at least two constant current sources, at least two of which are connected to at least two nodes of the transducer network. In one embodiment, two of the current sources replace completion resistors normally associated with bridge networks in which variable resistance transducers comprise one or two arms of the bridge. A third current source may be used with single remote active arm bridges to overcome errors normally associated with cable resistance temperature coefficient. In another embodiment, for voltage generating transducers, two of the current sources are used in conjunction with a precision resistor to develop a floating offset bias in the precision resistor to balance out the zero stimulus offset voltage of the transducer at the amplifier input while inserting negligible current into the transducer.

The novel features which are believed to be characteristic of the invention are set forth with particularity in the appended claims. The invention and further objects and advantages thereof can best be understood by reference to the following description and accompanying drawings in which:

Figure 1:
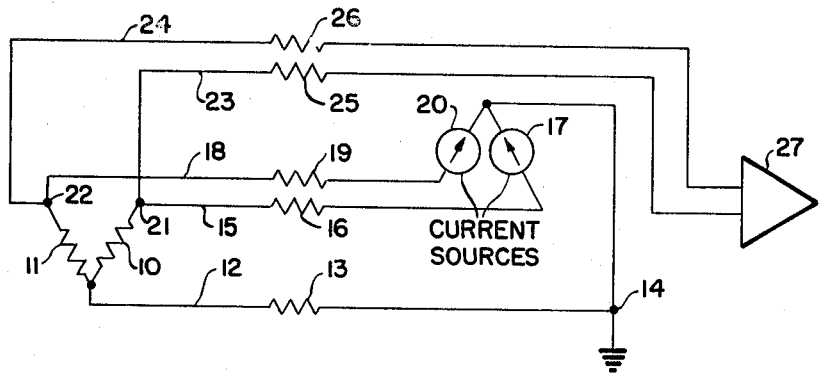
FIG. 1 is a schematic diagram of one embodiment of the invention employing multicurrent signal conditioning of two resistance transducer elements remotely located, one or both of which may be active.

Turning now to the drawings, FIG. 1 illustrates an embodiment of the invention in which two resistance transducer elements 10 and 11 are remotely located. Each of the elements 10 or 11 can contain several resistances or can be single-resistors. Either or both can be active. One end of each element 10 and 11 are connected together through a long lead 12, having a lead resistance shown as a lumped resistor 13, to a common point 14, which may be grounded. The other end of the element 10 is connected through a long lead 15, illustrated as having a lumped resistance 16, to one side of a constant current source 17, the other side of which is connected to common point 14, The other end of transducer element 11 is connected through a long lead 18, shown as having a lumped resistance 19, to one side of a constant current source 20, the other side of which is connected to common point 14 in the same polarity as source 17. A bridge is formed having the elements 10 and 11 as two branches and the constant current sources 17 and 20, together with leads 15 and 18, respectively, as the other two branches, with the constant current sources taking the place of the usual completion resistors. Two bridge output terminals or nodes 21 and 22, located at the points of connection of elements 10 and 11, with leas 15 and 18, respectively, are connected through long leads 23 and 24, respectively, to the input terminals of a differential amplifier 27. The amplifier 27, current sources 17 and 20 and common point 14 are located adjacent to each other.

The input signal to the amplifier 27, for constant gauge factor elements and constant currents, will be $$e_a = I_1 R'_{T1} \epsilon^{K_1 S_1} - I_2 R'_{T2} \epsilon^{K_2 S_2} \qquad (1)$$

where $K_1$ is the gauge factor of the element 10, $K_2$ is the gauge factor of the element 11, $S_1$ is the stimulus applied to transducer 10, $S_2$ is the stimulus supplied to transducer 11, $R'_{T1}$ is the value of the impedance of transducer 10 when $S_1$ is zero, $R'_{T2}$ is the value of the resistance of the transducer 11 when $S_2$ is zero, $I_1$ is the current in source 17 and $I_2$ is the current in source 20. The requirement that the input signal to the amplifier 27 be equal to zero when the stimuli $S_1$ and $S_2$ are equal to zero, is met by adjusting the ratio of the two currents so that $I_1/I_2 = R'_{T2}/R'_{T1}$     (2) When this adjustment has been made the input to the amplifier 27, on a small signal basis, is $e_a = I_1 R'_{T1} K_1 S_1 - I_2 R'_{T2} K_2 S_2$     (3) For the common situation where the two gauge factors are equal, that is, $K_1 = K_2 = K$, and the two stimuli $S_1$ and $S_2$ are equal and opposite, that is, $S_1 = -S_2 = S$, equation (3) simplifies to $e_a = (I_1 R'_{T1} + I_2 R'_{T2}) KS$     (4) Gauges are most often arranged this way for maximum bridge output. For instance, one gauge may be placed on one side of a sheet of metal to be stressed, with the other gauge placed on the opposite side so that when one gauge is in tension, the other is in compression. If the element 11 is inactive, that in $S_2$ always equals zero, equation 3) becomes $e_a = I_1 R'_{T1} K_1 S_1$     (5) or if the element 10 is inactive, that is $s_1$ always equals zero, equation (3) becomes $e_a = -I_2 R'_{T2} K_2 S_2$     (6)

Changes in line resistances 13, 16, 19, 25 and 26, have a negligible effect on the value of the input signal to amplifier 27. Resistances 25 and 26 are not important due to the high input impedance of the amplifier 27, which is typically greater than 20 megohms. The resistors 16 and 19 are not important because of the high output impedances of the current sources 17 and 20, which are typically greater than $10^8/I$ ohms, where $I$ is the transducer current in milliamperes, and will be described hereinafter. The impedance 13 is not important because the common mode voltage appearing across it is adequately rejected by the amplifier 27, which has a typical common mode rejection of greater than 120 db. at a gain of 1,000. A typical amplifier which may be used is described in part in U.S. Pat. No. 3,506,926, issued Apr. 14, 1970 to W. E. Shoemaker entitled "Direct Coupled Differential Transistor Amplifier with Improved Offset Voltage Temperature Coefficient" and Ser. No. 496,878—Weekes et al. entitled "Direct Coupled Differential Transistor Amplifier with Improved Common Mode Performance" copending herewith and assigned to the assignee of the present invention. Such an amplifier is available from the assignee under its Model No. C-44.

In the prior art employing a constant voltage bridge or a single constant current bridge, where the active elements are located remote from the bridge completion resistors, the resistance of the cable conductors contributes to the offset voltage errors and circuit sensitivity errors. With multicurrent signal conditioning as described above, these errors are practically nonexistant and temperature changes which cause changes in the conductor resistances, involving an important source of error in conventional signal conditioning in which the conductor resistance is in the bridge arm, are insignificant when multicurrent signal conditioning is used.

Large transducer resistance changes can be accommodated with multicurrent transducer conditioning without introducing nonlinearities. This is attributable to the very high output resistance of the current sources which causes insignificant nonlinear loading errors. In constant voltage or single constant current transducer conditioning, bridge completion resistors are typically equal to the transducer resistance at zero applied stimulus and, hence, significant nonlinear loading errors will be generated for large transducer resistance changes. It is for this reason that multicurrent transducer conditioning is ideal for semiconductor gauges, thermistors and resistance temperature detectors where it is required that transducer output voltage be a linear function of transducer resistance.

Another advantage of the multicurrent signal conditioning technique lies in the accuracy and ease of calibration, which is accomplished in a circuit such as FIG. 1 by changing $I_1$ and/or $I_2$ by accurate predetermined percentages. For example, changing $I_1$, the current in constant current source 17, by a precise 1 percent produces the same change in $e_a$ as a precise 1 percent change in the resistance of active element 10 would produce. Calibration thus requires only that the gauge factor be known. The actual value of the resistance of elements 10 and 11 does not affect the calibration. In a conventional bridge signal conditioner, calibration is usually accomplished by switching a precise resistance across the active element and requires that both the gauge factor and the resistance of each active element be known. Multicurrent signal conditioning calibration is more accurate because the uncertainty to which the resistance of the active elements is known is not a factor.

Also, assuming equal arm or transducer currents and that the resistances of any passive arms, or completion resistors, are equal to the transducer resistances, the circuit sensitivity of the embodiment illustrated in FIG. 1 is twice as great since, in the method employing bridge completion resistors, the signal is loaded by the completion resistor which does not change. Multicurrent conditioning is also beneficial because of the reduced cable costs involved. For example, in multicurrent conditioning a four-conductor cable, with the shield as the fifth conductor in which AWG No. 22 or larger number gauge, that is, smaller size, can be used as the conductors, is more than adequate with multicurrent transducer conditioning. With conventional conditioning, up to eight conductors are sometimes required in which two of the conductors are usually AWG No. 18 or smaller number gauge, that is, larger size.

Figure 2:
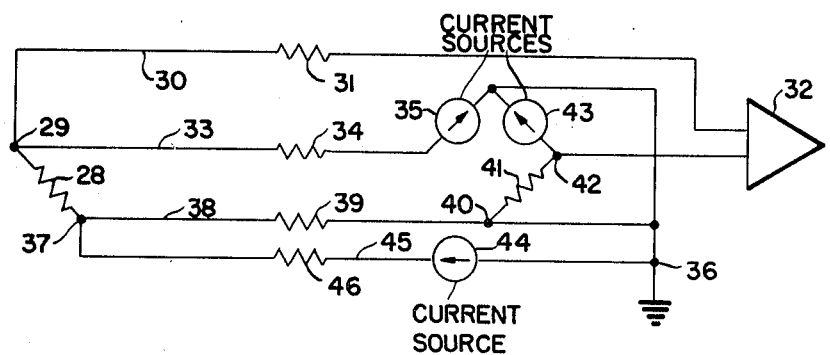
FIG. 2 is a schematic of another embodiment employing a multicurrent signal conditioning of a single-resistance element transducer remotely located.

FIG. 2 shows an alternate embodiment of the invention for conditioning a single-transducer element remotely located. In this case, the remote sensor element 28 has one terminal 29 connected through a long lead 30, shown as having a lumped resistance 31, to one input of amplifier 32. Terminal 29 is also connected through a long lead 33, shown as having a lumped resistance 34, to one side of a constant current source 35. The other side of constant current source 35 is connected to common terminal 36, which may be connected to ground. The other terminal 37 of the sensor element 28 is connected through a long lead 38, shown as having a lumped resistance 39, to one terminal 40 of a fixed resistance 41. Terminal 40 is also connected to common terminal 36. The other terminal 42 of the resistance 41 is connected to a second input to amplifier 32 and also connected through a constant current source 43 to common terminal 36. In addition, a third constant current source 44 is shown connected to terminal 36 and through long lead 45, shown as having a lumped resistance 46, to terminal 37. Amplifier 32, constant current sources 35, 43, and 44, resistor 41 and common point 36 are located adjacent each other. At terminal 36, $I_1$ and $I_2$ are similarly poled and $I_3$ is oppositely poled.

In this embodiment the current in constant current source 44, $I_3$, is made equal to the current in constant current source 35, $I_1$, both during calibration and during a data run, to the desired degree of accuracy. Applying Kirchoff's law to the junction at terminal 37, it can be seen that only the difference between the currents $I_1$ and $I_3$ exists in the resistance 39. This difference is small enough so that the input voltage to the amplifier 32 is essentially independent of typical values of resistance 39. Performance of the system of FIG. 2 is the same as for the system of FIG. 1, when $I_1$ minus $I_3$ is sufficiently small, and calibration may be carried out in a similar manner making certain that any percentage change in $I_1$ is also made in $I_3$.

Figure 3:
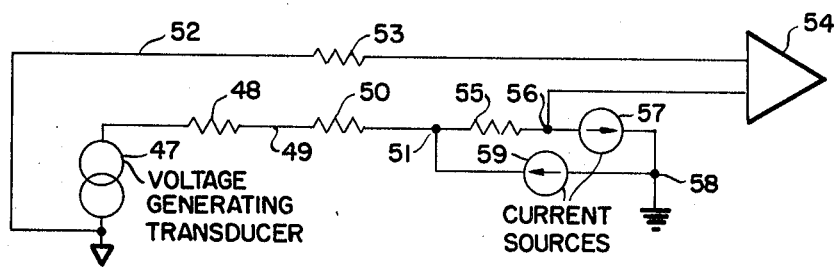
FIG. 3 illustrates a schematic of still another embodiment of a multicurrent signal conditioner for a voltage generating transducer.

FIG. 3 illustrates how currents such as $I_1$ and $I_3$ of FIG. 2 can be used to produce a floating voltage to balance out the zero stimulus offset voltage of a voltage generating transducer 47, illustrated with its internal resistance lumped as resistance 48. One side of transducer 47 is connected through a long lead 49, shown as having a lumped resistance 50, to a terminal 51. The other side of transducer 47 is connected to a common point which has a low impedance to terminal 58 and through a long lead 52, shown as having a lumped resistance 53, to one side of the input of an amplifier 54. A precision resistor 55 is connected from terminal 51 to terminal 56. Terminal 56, in turn, is connected to the other side of the input of amplifier 54. Terminal 56 is also connected through a current source 57 to a common terminal 58, which may be connected to ground. A second current source 59 is connected from terminal 58 to terminal 51. Amplifier 54, resistor 55, sources 57 and 59 and common terminal 58 are adjacent each other, and sources 57 and 59 are oppositely poled at terminal 58.

Where the current through constant current source 57 is designated as $I_1$, and that through constant current source 59 is designated as $I_3$, it can be shown by applying Kirchoff's law to the junction at terminal 51 that only the difference between $I_1$ and $I_3$ exists in the transducer 47. The resistor 55 is made large enough so that the product $(I_1 - I_3)(R_L + R_{T3})$ is sufficiently small, where $R_L$ is the value of resistance 50 and $R_{T3}$ the internal resistance 48 of the transducer 47. Thus, the magnitude of the offset voltage applied to the transducer 47 may be varied by varying the resistor 55, so that with zero stimulus supplied to transducer 47, zero input is applied to amplifier 54.

Figure 4:
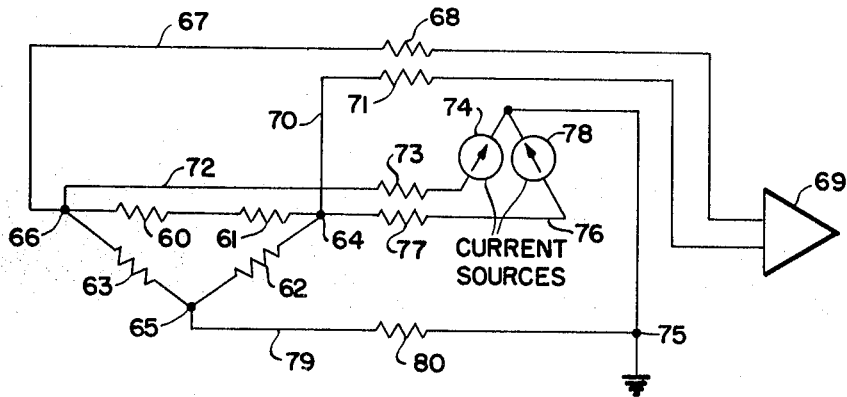
FIG. 4 illustrates a schematic of an embodiment employing dual current conditioning of a four element bridge, where it is impractical to rewire the elements for physical reasons.

A multicurrent supply, such as may be used in connection with FIGS. 1–3 above, may also be used to condition a four-element bridge such as illustrated in FIG. 4, where it is inconvenient to electrically separate the bridge elements. The bridge, consisting of the four elements 60, 61, 62 and 63 is connected by using the three terminals 64, 65 and 66 between the elements 61 and 62, 62 and 63, and 63 and 60, respectively. Terminal 66 is connected through a long lead 67, shown as having a lumped resistance 68, to one side of the input of amplifier 69. Terminal 64 is connected through a long lead 70, shown as having a lumped resistance 71, to the other side of the input of amplifier 69. Terminal 66 is also connected through a long lead 72, shown as having a lumped resistance 73, to one side of a current source 74, the other side of which is connected to common terminal 75, which may be connected to ground. Terminal 64 is connected through a long lead 76, shown as having a lumped resistance 77, to one terminal of a constant current source 78, the other terminal of which is connected to common terminal 75 in same polarity as source 74. A long lead 79, shown as having a lumped resistance 80, is connected between terminals 65 and 75. Sources 74 and 78, amplifier 69 and terminal 75 are adjacent.

In this embodiment, the common mode voltage appearing across impedance 80 is adequately rejected by the amplifier 69, which has a typical common mode rejection of greater than 120 db. at a gain of 1,000, as previously stated. The constant current sources 74 and 78 again have output resistances greater than $10^8/I$ ohms in which $I$ is the transducer current in milliamps, selectable from 1 to 50. These are close to ideal current generators when compared to transducer resistances in the range of zero to 10 kilohms and typical cable conductor resistances of zero to 100 ohms. Hence, again the cable conductor resistances 73 and 77, shown to be in series with the current sources 74 and 78 respectively, have a negligible effect on the value of the input signal to amplifier 69, and the cable conductor impedances 68 and 71, in series with the amplifier 69 input, are not important due to the amplifier's high input resistance.

With four active arms, the circuit illustrated in FIG. 4 has only half the sensitivity of the corresponding prior art circuit employing constant voltage or single-constant current transducer conditioning, again assuming equal arm or transducer currents and that any bridge completion resistances or passive arms are equal to the transducer resistances or active arms. However, the effects of variations in the resistance of the long leads associated with the remote transducers, are overcome and the embodiment is shown to illustrate the flexibility of the multicurrent approach.

As used throughout this specification, the terms "remotely located", "remote", or "long leads" refer to locations of the arms of the various networks such as 10 or 11 of FIG. 1, 28 of FIG. 2, 47 of FIG. 3, and 60, 61, 62 and 63 of FIG. 4, at a distance from their associated amplifier and constant current sources, such that their connection thereto requires the use of long leads such as 12, 15, 18, 23 and 24 of FIG. 1 having appreciable lead resistances so as to affect the measuring circuit. The term "adjacent" is used to define the positioning of elements such as current sources 35 and 43, resistor 41 and amplifier 32 in FIG. 2, which may be interconnected with relatively short leads not having appreciable impedance and not subject to significant changes due to temperature changes.

By way of example, but not limited thereto, the constant current supply illustrated in U.S. Pat. No. 3,457,493, entitled "Multiple Constant Current supply," issued July 22, 1969 to W. E. Shoemaker et al., and incorporated herein by reference may be used to provide the currents required by the circuits of FIGS. 1–4.

Since the principles of the invention have now been made clear, modifications which are particularly adapted for specific situations without departing from those principles will be apparent to those skilled in the art. The appended claims are intended to cover such modifications as well as the subject matter described and to only be limited by the true spirit of the invention.

We claim:

1. A transducer network having a plurality of circuit branches and related circuit nodes with constant current source conditioning comprising:

at least one transducer monitoring device connected in at least one of said circuit branches, said transducer device having a variable impedance which is altered in response to a certain condition being monitored;

a plurality of impedance components having impedance values which are invariant to said monitored condition, said components being connected in the other of said circuit branches;

a constant current supply comprising a multiplicity of constant current sources for supplying a constant current to said at least one transducer monitoring device and said plurality of impedance components connected in said transducer network, each of said constant current sources being coupled to a common reference node; and, first conducting means for connecting each of said multiplicity of constant current sources to a respective one of said plurality of circuit nodes, said first conducting means having respective impedances through each of which the respective constant current from one of said multiplicity of constant current sources is conducted.

2. A transducer network with constant current source conditioning comprising:

an amplifier having a pair of high impedance input terminals;

a transducer circuit comprising two branches and three nodes which are remotely located from said amplifier to form two arms of a bridge network, one node being at the junction of said arms and the other two nodes being at the unjoined ends of said arms, respectively;

a constant current supply comprising two constant current sources located adjacent said amplifier, said current sources being connected together at one similarly poled extremity forming a common reference node;

first conducting means comprising a three-conductor cable having inherent impedance, a first conductor of said cable connecting said common reference node to the junction node of arms, a second conductor connecting one of said two constant current sources to one of said unjoined ends of said arms, a third conductor connecting the other of said two constant current sources to the other of said unjoined ends of said arms; and, second conducting mean comprising a two-conductor cable having inherent impedance, said two-conductor cable connecting said pair of input terminals of said amplifier to said unjoined ends of said arms.

3. A transducer network with constant current source conditioning comprising:

an amplifier having a pair of high impedance terminals;

a transducer circuit comprising two branches and four nodes, of which one of said branches and two nodes are remotely located from said amplifier and the other of said branches and two nodes are located adjacent said amplifier;

a constant current supply comprising three constant current sources located adjacent said amplifier, two of said three constant current sources being connected together at one similarly poled extremity and in turn connected to the opposite poled extremity of the third current source thereby forming a common reference node, one of said two sources being connected to one node of said other of said branches and also to one input of said amplifier, said common reference node being connected to the other node of said other of said branches;

first conducting means comprising a three-conductor cable having inherent impedance, a first conductor of said cable connecting the other of said two current sources to one node of said one of said branches, a second conductor connecting the other node of said other of said branches to the other node of said branches, a third conductor connecting said third current source to said other node of said one of said branches; and second conducting means comprising a single conductor having inherent impedance, said conductor connecting the other input of said amplifier to said one node of said one of said branches.

4. A transducer network with constant current source conditioning comprising:

an amplifier having a pair of high impedance input terminals;

a transducer circuit comprising two branches and four nodes, of which one of said branches and two nodes is a voltage generating transducer remotely located from said amplifier, the other of said branches and two nodes being a passive arm located adjacent said amplifier;

a constant current supply comprising two constant current sources located adjacent said amplifier, said sources being connected together at one oppositely poled extremity thereby forming a common reference node, one of said two sources being connected to one end of said passive arm and the other of said two sources being connected to the other end of said passive arm and also to one input of said amplifier;

first conducting means comprising a single-conductor cable having inherent impedance, said single-conductor connecting said one end of said passive arm to one end of said voltage generating transducer; and, second conducting means comprising a single-conductor cable having inherent impedance, said single-conductor cable connecting the other input of said amplifier to the other end of said voltage generating transducer.

5. A transducer network with constant current source conditioning comprising:

an amplifier having a pair of high impedance input terminals;

a transducer circuit comprising four branches and four nodes which are remotely located from said amplifier to form four arms of a bridge network, each of said four nodes being at the junction of two of said four arms;

a constant current supply comprising two constant current sources located adjacent said amplifier, said current sources being connected together at one similarly poled extremity forming a common reference node;

first conducting means comprising a three-conductor cable having inherent impedance, a first conductor of said cable connecting said common reference node to a first node of said four nodes of said bridge network, second and third conductors of said cable connecting said two constant current sources respectively to diagonally opposite second and third nodes of said bridge network; and second conducting means comprising a two-conductor cable having inherent impedance, said cable connecting said amplifier input terminals to said second and third nodes respectively of said bridge network.

UNITED STATES PATENT OFFICE
CERTIFICATE OF CORRECTION

Patent No. 3,605,008      Dated September 14, 1971

Inventor(s) William E. Shoemaker et al.

It is certified that error appears in the above-identified patent and that said Letters Patent are hereby corrected as shown below:

Column 2, line 33, "leas" should read -- leads --. Column 6, line 34, after "of" insert -- said --; line 46, after "impedance" insert -- input --; line 67, after "said" insert -- one of said --.

Signed and sealed this 18th day of April 1972.

(SEAL)
Attest:

EDWARD M. FLETCHER, JR.
Attesting Officer

ROBERT GOTTSCHALK
Commissioner of Patents